United States Patent [19]

Trouchet

[11] Patent Number: 5,675,675
[45] Date of Patent: Oct. 7, 1997

[54] BANDWIDTH-ADJUSTED WAVELENGTH DEMULTIPLEXER

[75] Inventor: Denis M. Trouchet, Quincy Sous Senart, France

[73] Assignee: Corning Incorporated, Corning, N.Y.

[21] Appl. No.: 581,186

[22] Filed: Dec. 29, 1995

[51] Int. Cl.$^6$ .................................................. G02B 6/293
[52] U.S. Cl. ........................... 385/24; 385/14; 385/37; 385/43; 385/47
[58] Field of Search ........................ 385/14, 15, 16, 385/18, 24, 27, 31, 37, 39, 43, 47

[56] References Cited

U.S. PATENT DOCUMENTS

| | | | |
|---|---|---|---|
| 4,175,827 | 11/1979 | McMahon | 385/16 |
| 4,522,461 | 6/1985 | Mannschke | 385/34 |
| 4,611,886 | 9/1986 | Cline et al. | 385/92 |
| 4,634,215 | 1/1987 | Reule | 385/43 |
| 4,674,827 | 6/1987 | Izutsu et al. | 385/132 |
| 4,723,829 | 2/1988 | Koonen | 385/37 |
| 4,747,649 | 5/1988 | Heinen et al. | 385/14 |
| 4,773,063 | 9/1988 | Hunsperger et al. | 359/130 |
| 4,786,131 | 11/1988 | Mahapatra et al. | 385/46 |
| 4,786,133 | 11/1988 | Gidon et al. | 385/37 |
| 4,787,689 | 11/1988 | Korotky et al. | 385/130 |
| 4,800,557 | 1/1989 | Weber | 359/130 |
| 4,904,042 | 2/1990 | Dragone | 385/46 |
| 5,002,350 | 3/1991 | Dragone | 359/124 |
| 5,020,910 | 6/1991 | Dunn et al. | 356/328 |
| 5,026,131 | 6/1991 | Jannson et al. | 359/15 |
| 5,136,671 | 8/1992 | Dragone | 385/46 |
| 5,212,758 | 5/1993 | Adar et al. | 385/129 |
| 5,228,103 | 7/1993 | Chen et al. | 385/14 |
| 5,305,412 | 4/1994 | Paoli | 385/122 |
| 5,325,221 | 6/1994 | Van der Tol | 359/116 |
| 5,343,542 | 8/1994 | Kash et al. | 385/31 |
| 5,371,813 | 12/1994 | Artigue | 385/24 |

OTHER PUBLICATIONS

"New Focusing and Dipersive Planar Component Based on an Optical Phased Array" by M.K. Smit, Electronics Letters, vol. 24, No. 7, Mar. 31, 1988, pp. 385–386.

"Low–loss Planar Optical Polarisation Splitter with Small Dimensions" by A.R. Vellekoop and M.K. Smit, Electronics Letters, vol. 25, No. 15, Jul. 20, 1989, pp. 946–947.

"Monolithic InP–based Grating Spectrometer for Wavelength–division Multiplexed Systems at 1.5 µm" by J.B.D. Soole et al., Electronics Letters, vol. 27, No. 2, Jan. 17, 1991, pp. 132–134.

"10 GHz Spacing Optical Frequency Division Multiplexer Based on Arrayed–waveguide Grating" by H. Takahashi et al., Electronics Letters, vol. 28, No. 4, Feb. 13, 1992, pp. 380–382.

"Flat–field Spectrograph in $SiO_2/Si$" by P.C. Clemens et al., IEEE Photonics Technology Letters, vol. 4, No. 8, 1992, pp. 886–887. (No Month).

"On the Theory of Planar Spectrographs" by Reinhard März et al., Journal of Lightwave Technology, vol. 10, No. 12, Dec. 1992, pp. 2017–2020.

"Novel 1×N Guided–Wave Multi/Demultiplexer for FDM" by H. Uetsuka et al., OFC '95 Technical Digest, pp. 76–77. (1995) (No Month).

*Primary Examiner*—John D. Lee
*Attorney, Agent, or Firm*—William J. Chervenak

[57] ABSTRACT

A tradeoff between crosstalk and channel bandwidth in dense wavelength demultiplexers is achieved by varying mode fields of input and output waveguides. Funnels are formed between inner and outer ends of the input and output waveguides to increase mode field radii, which results in decreased crosstalk attenuation but larger bandwidth channels.

25 Claims, 2 Drawing Sheets

BANDWIDTH-ADJUSTED WAVELENGTH DEMULTIPLEXER

TECHNICAL FIELD

The invention relates to optical communication systems including wavelength multiplexers and demultiplexers that route optical signals according to their wavelength.

BACKGROUND

Optical signals of different wavelengths traveling in separate optical fibers can be routed into a single optical fiber by a wavelength multiplexer and later rerouted into separate optical fibers by a wavelength demultiplexer. Generally, the devices used in multiplexing and demultiplexing operations must be reversible so the same devices function as multiplexers in one direction of travel and as demultiplexers in the opposite direction of travel.

The devices include input and output optical conductors interconnected by a dispersing and focusing component. In a planar optical circuit, which is the preferred form for my invention, the input and output conductors are waveguides formed by a core material deposited on a planar substrate and covered by a similarly deposited layer of cladding having a different refractive index. Typically, a diffractive optic is also formed on the substrate for dispersing light by wavelength. The diffractive optic can also be used for focusing the different wavelengths of light, or a separate lens can be used for this purpose.

In the multiplexing mode, the focusing diffractive optic overlays light of different wavelengths emitted by respective input waveguides on a single output waveguide. In the demultiplexing mode, the diffractive optic separates the different wavelengths of light emitted by a single input waveguide and focuses the separated light on respective output waveguides.

Several competing factors are considered in the design of multiplexing/demultiplexing devices. For example, a high density of channels within a narrow range of wavelengths is preferred. However, the bandwidth of each channel is preferably as broad as possible to accommodate practical realities of wavelength variation of the channels, and crosstalk is preferably held to a minimum to distinguish adjacent channels.

SUMMARY OF INVENTION

My invention is directed to optimizing a tradeoff between channel bandwidth and crosstalk attenuation in the design of planar wavelength multiplexers and demultiplexers. The tradeoff, given a predetermined wavelength channel with two adjacent channels, is controlled by adjusting the size of input and output waveguide mode fields. An increase in the mode field radius (i.e., the radius of the intensity profile at $1/e^2$ from the maximum intensity) increases channel bandwidth but decreases crosstalk attenuation. However, given a tolerance for the amount of crosstalk attenuation, which is measured as the signal attenuation at adjacent channels, bandwidth can be optimized by adjusting the mode field radius.

The waveguide mode field size can be adjusted by using funnels for changing the width of the input and output waveguides. For example, my invention can be practiced as a demultiplexer having a single input waveguide that conveys a plurality of optical signals in different wavelength channels and a series of output waveguides that separately convey the different wavelength channels. A dispersing and focusing optic disperses the different wavelength channels emitted from an inner end of the input waveguides and focuses the different wavelength channels on inner ends of the series of output waveguides. The funnels can be formed at these inner ends of the input and output waveguides and vary in width along respective lengths of the waveguides for changing the mode field radius. The funnels can also be formed at any place along the waveguides between their inner and outer ends. If so, larger width waveguides are used to guide the light between the funnels and the inner waveguide ends.

The funnels have an outer width corresponding to the width of the waveguides between the funnels and the outer waveguide ends, an inner width to produce the desired mode field at the inner waveguide ends, and a half-angle measuring a slope of funnel transition from the outer width to the inner width. The half-angle is preferably less than 0.5 degrees to provide an adiabatic transition between the two widths. The funnels at the inner ends of both the input and output waveguides are preferably similarly sized to minimize other coupling losses.

Although there is no easy relationship between these funnel parameters and the mode field radius, increasing the inner width of the funnels is known to increase the mode field radius. The relationship between the mode field radius and channel bandwidth or crosstalk attenuation can be derived from a coupling coefficient between the input and output waveguides, which can be expressed as decibel losses over a domain of wavelengths centered at the respective channel wavelengths.

The channel bandwidth is defined as a range of wavelengths at which the decibel loss is less than a predetermined amount, and crosstalk attenuation is defined as the decibel loss at the adjacent channel wavelengths. Any excess crosstalk attenuation can be converted into broadened channel bandwidth by increasing the mode field radius. The funnels provide for increasing the mode field radius and preserving the required width of the waveguides at their outer ends for connection to a larger optical system.

DRAWINGS

DETAILED DESCRIPTION

Figure 1:
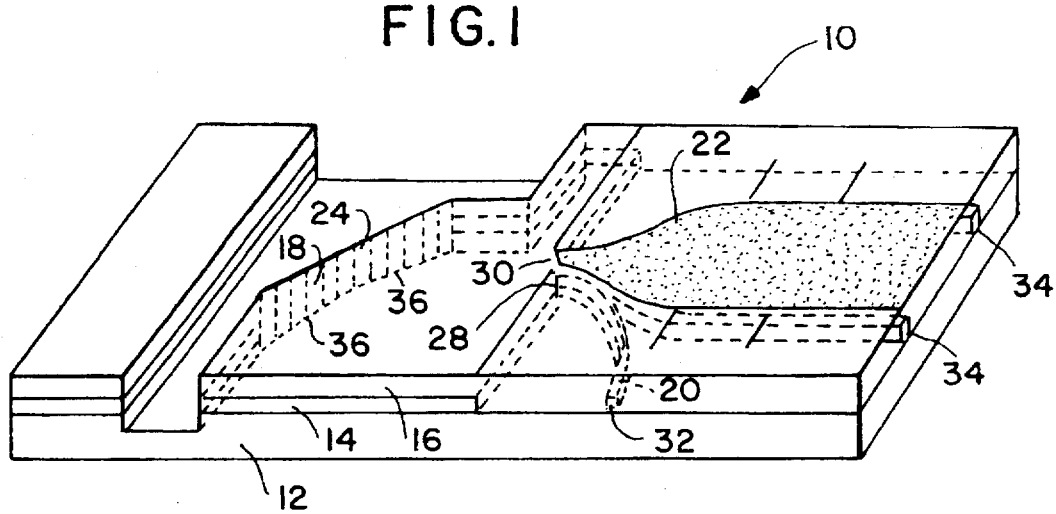
FIG. 1 is a schematic perspective view of my invention arranged as a multiplexer/demultiplexer in a planar optical circuit.

A preferred embodiment of my invention implemented as a planar optic is shown in the drawing figures. The embodiment is described with respect to a direction of light travel for a demultiplexer but could function equally well in the opposite direction of light travel as a multiplexer. In fact, the terms multiplexer and demultiplexer are used only for the purpose of referencing the embodiment to one of these possible functions but do not exclude the other.

A planar optical circuit 10 for a dense wavelength demultiplexer is formed on a substrate 12, such as silica. The remaining two layers are layers of core material 14 and cladding material 16, which have different refractive indices. Examples include silicon dioxide as a cladding material 16 and germania doped silicon dioxide as the core material 14. Well-known deposition techniques can be used to produce the layers of core material 14 and cladding material 16.

Input waveguide 20 and output waveguides 22 converge to the periphery of a so-called Rowland circle tangent on which a circular diffraction grating 24 with a radius of curvature equal to the Rowland circle diameter is also located. The input and output waveguides 20 and 22 have respective inner ends 28 and 30 on the Rowland circle and outer ends 32 and 34 that are appropriately separated around the periphery of the planar optical circuit 10 for connection to a larger optical system (not shown). Facets 36 of the diffraction grating 24 are etched into the layers of core material 14 and cladding material 16 and are covered by a reflective coating 18.

The input and output waveguides 20 and 22 are positioned on the Rowland circle with respect to the diffraction grating 24 so that a mode field at the inner end 28 of the input waveguide 20 is focused on the various inner ends 30 of the output waveguides 22 according to the respective wavelengths of the imaged light. Thus, the channel wavelength selection is performed by the location of the inner ends 30 of the output waveguides 22. To produce channels with a constant wavelength spacing, the inner ends 30 of the output guides 22 must be equally spaced on center on the Rowland circle. The spacing "s" (expressible in units of μm) between two waveguides and the channel wavelength spacing "$s_\lambda$" (expressible in units of nm) must fit with the wavelength dispersion "σ" (expressible in units of μm/nm) generated by the grating 24 on the Rowland circle as follows:

$$s = \sigma s_\lambda$$

Assuming the design is free of optical aberration, the diffracted fields are an exact image of the input waveguide mode field and their location around the Rowland circle is determined by the channel wavelengths "$\lambda_o$". Light coupled to the output waveguides 22 is an overlap integral between the diffracted fields produced by the diffraction grating 24 and the output waveguide mode fields. A coupling coefficient between two such identical fields with a distribution approximately gaussian is given by a simple function as follows:

$$dB_{loss} = 4.34 \left[ \frac{\sigma(\lambda - \lambda_o)}{w} \right]^2$$

where "$dB_{loss}$" is an amount of signal loss in decibels, "λ" is one of a range of wavelengths in the vicinity of the channel wavelength "$\lambda_o$", and "w" is the common radius of the mode fields (in units of μm).

Figure 4:
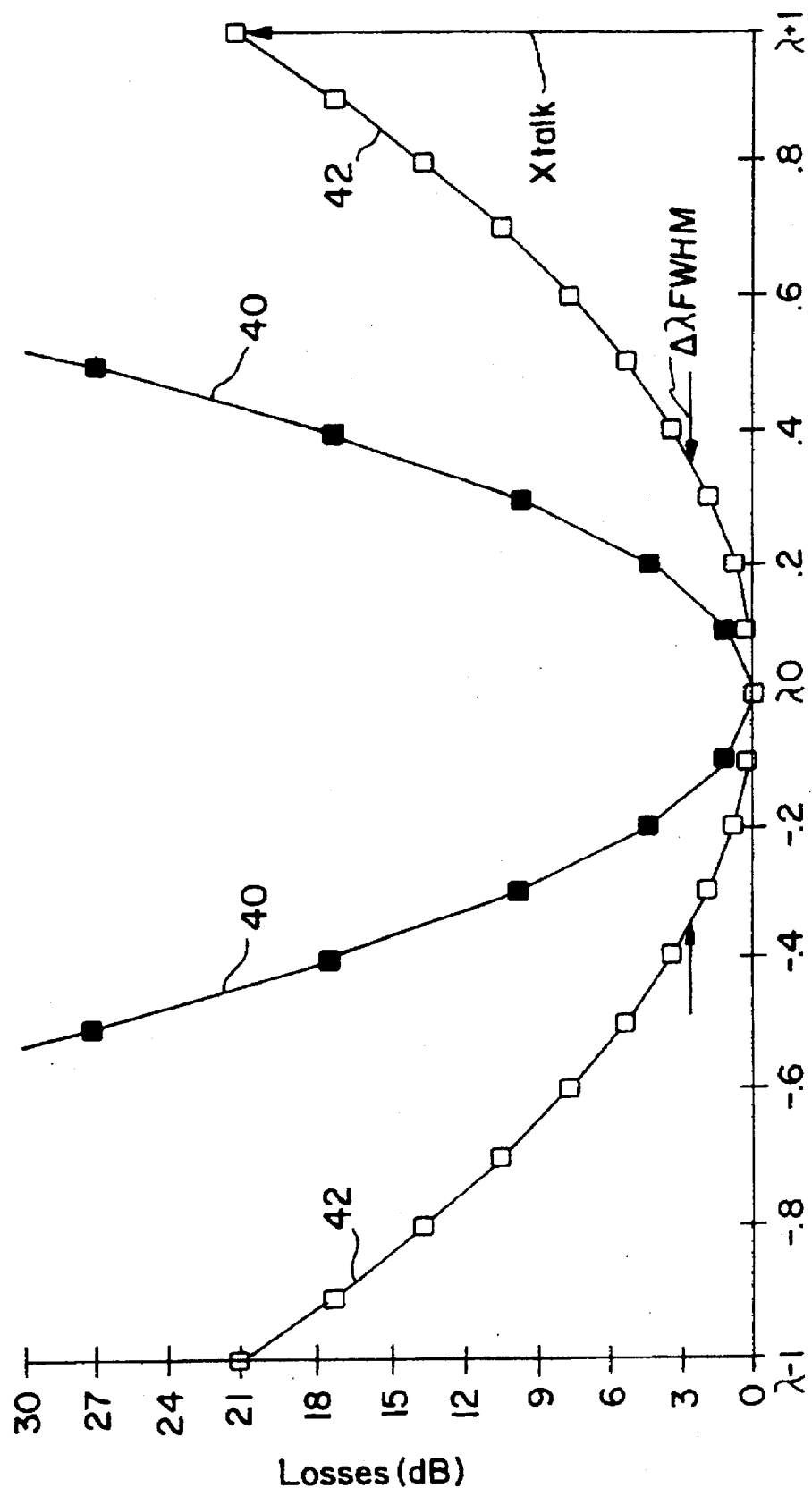
FIG. 4 is a graph of a coupling coefficient function showing the effect of variations in mode field radius on decibel losses over a domain of wavelengths centered at an exemplary channel wavelength.

FIG. 4 graphs this function for two different values of the mode field radius "w". A channel spacing "$s_\lambda$" of 1 nm and a wavelength dispersion "σ" of 20 μm/nm are assumed, which lead to a spacing "s" of 20 μm between two adjacent output waveguides on the Rowland circle. The curve 40, which has the greatest curvature at the channel wavelength "$\lambda_o$", represents a mode field radius "w" of 4 μm, and the curve 42 represents a mode field radius "w" of 9 μm. Substituting the channel spacing "$s_\lambda$" for the term "$(\lambda - \lambda_o)$" yields an expression for crosstalk attenuation "Xtalk" on the adjacent channels as follows:

$$Xtalk = 4.34 \left[ \frac{\sigma s_\lambda}{w} \right]^2$$

The crosstalk attenuation "Xtalk" for the curve 40 is over 100 decibels, which is generally well above usual requirements for crosstalk attenuation in the vicinity of 20 decibels. The crosstalk attenuation "Xtalk" for the curve 42 is about 21 decibels. The two curves 40 and 42 also effect channel bandwidth "$\Delta\lambda_{FWHM}$", which is defined as a range of wavelengths at which the decibel loss "$dB_{loss}$" is less than a predetermined amount (e.g., 3 decibels). Substituting the half channel bandwidth "$\Delta\lambda_{FWHM}/2$" for the term "$(\lambda - \lambda_o)$" of the coupling coefficient and rearranging yields the following expression:

$$\Delta\lambda_{FWHM} = \frac{2w\sqrt{\frac{dB_{loss}}{4.34}}}{\sigma}$$

At a given decibel loss "$dB_{loss}$" of 3 decibels, the expression for channel bandwidth "$\Delta\lambda_{FWHM}$" simplifies as follows:

$$\Delta\lambda_{FWHM} = \frac{1.66w}{\sigma}$$

As the mode field radius "w" increases from 4 μm to 9 μm, the channel bandwidth "$\Delta\lambda_{FWHM}$" also increases from 0.33 nm to 0.75 nm. Thus, the excess crosstalk attenuation "Xtalk" above 20 decibels can be exchanged for the increased channel bandwidth "$\Delta\lambda_{FWHM}$" by increasing the mode field radius "w".

Figure 2:
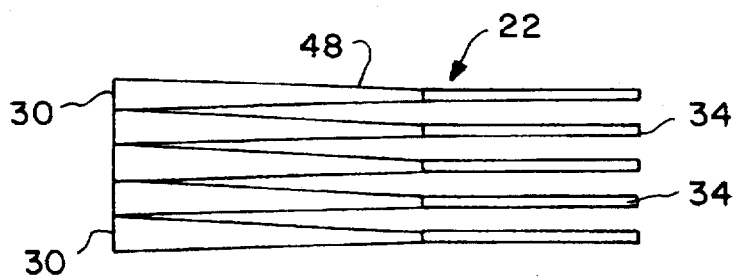
FIG. 2 is an enlarged plan view of a series of output waveguides with funnels formed at their inner ends.
Figure 3:
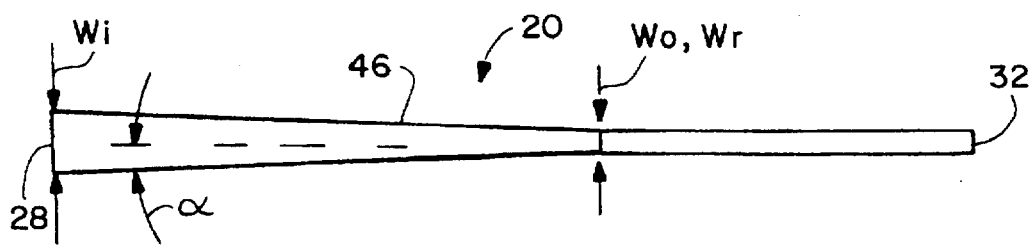
FIG. 3 is a further enlarged and straightened plan view of a similar input waveguide referencing parameters that define the funnels.

FIGS. 2 and 3 illustrate the use of funnels 46 and 48 at the respective inner ends 28 and 30 of the input and output waveguides 20 and 22 for adjusting the mode field radius "w". As shown in FIG. 3, the funnel 46, which exemplifies all of the funnels 46 and 48, has an outer width "$W_o$" that is equal to a width "W" of the remaining waveguide 20 and an inner width "$W_i$" measured at the inner end 28 of the waveguide 20. A transition between the outer and inner widths "$W_o$" and "$W_i$" is measured by half-angle "α", which is preferably less than 0.5 degrees to provide an adiabatic transition without higher mode coupling.

Although a number of other factors affect the mode field radius "w", I have found that increasing the inner width "$W_i$" with respect to a predetermined outer width "$W_o$" of the funnels 46 and 48 increases the mode field radius "w". For example, I have found that the mode field radius "w" of a 6.5 μm square waveguide (i.e., $W_o$=6.5 μm) can be increased from 4 μm to 6 μm by gradually increasing the size of the waveguide to an inner width "$W_i$" of 14 μm. The maximum inner width "$W_i$" is first limited by the spacing "s" between the inner ends of the output waveguides. Depending on process characteristics, the maximum inner width "$W_i$" can also be limited by proximity coupling between two adjacent channels. This proximity coupling induces a coupling of light from one waveguide to the other which must be kept greater than the targeted crosstalk attenuation "Xtalk". Also, the funnels 46 and 48 are preferably identically sized to avoid additional coupling losses.

My invention can also be practiced in a variety of other arrangements including hybrid optics with planar waveguides combined with bulk optics for dispersing and focusing light between the waveguides. Separate optical elements could also be used for performing the dispersing and focusing functions. For example, a non-focusing diffraction grating could be used in combination with a lens.

Variable length waveguides or other structures for dispersing light by wavelength could be used in place of a diffraction grating.

I claim:

1. A wavelength multiplexer/demultiplexer for routing optical signals within different wavelength channels and having a requirement for a minimum amount of crosstalk attenuation between adjacent channels of at least 20 decibels comprising:

a first conductor that conveys a plurality of optical signals within the different wavelength channels along a length that extends between outer and inner ends;

a series of second conductors that separately convey the optical signals within the different wavelength channels along respective lengths that extend between inner and outer ends;

a dispersing and focusing optic that disperses the optical signals within the different wavelength channels emitted from said inner end of the first conductor and separately focuses the respective optical signals within the different wavelength channels on said inner ends of the series of second conductors;

couplings coefficient being defined between said first conductor and each of said second conductors expressible as a loss in decibels over a domain of wavelengths centered at the respective channel wavelengths;

each of said different wavelength channels having a channel bandwidth defined by a range of wavelengths at which the decibel loss is varied by less than a predetermined amount;

funnels formed between said inner and outer ends of the second conductors and having a first width corresponding to a width of said second conductors between said funnels and said outer ends of the second conductors and a second width corresponding to a width at said inner ends of the second conductors; and said second width being adjusted with respect to said first width to achieve said minimum amount of crosstalk attenuation at a maximized amount of channel bandwidth.

2. The multiplexer/demultiplexer of claim 1 in which crosstalk attenuation is measured as the decibel loss at the adjacent channel wavelengths.

3. The multiplexer/demultiplexer of claim 2 in which said funnels are shaped to reduce crosstalk attenuation while expanding the channel bandwidth to exploit excess crosstalk attenuation.

4. The multiplexer/demultiplexer of claim 1 in which a funnel is also formed between said inner and outer ends of the first conductor.

5. The multiplexer/demultiplexer of claim 4 in which said funnel formed between said inner and outer ends of the first conductor is sized similar to said funnels formed between said inner and outer ends of the second conductors for reducing coupling losses.

6. The multiplexer/demultiplexer of claim 1 in which said funnels are further defined by a half-angle measuring a slope of funnel transition from said first width to said second width.

7. The multiplexer/demultiplexer of claim 6 in which said half-angle is limited to provide an adiabatic transition between said first and second widths.

8. The multiplexer/demultiplexer of claim 7 in which the half-angle is no greater than 1 degree.

9. The multiplexer/demultiplexer of claim 6 in which said second width of the funnels is smaller than a spacing between said inner ends of two adjacent second conductors.

10. An optical routing device referenced in a direction of light travel for demultiplexing signals of different wavelength channels and having a requirement for a minimum amount of crosstalk attenuation between adjacent channels comprising:

an input waveguide exhibiting an input waveguide mode field;

a series of output waveguides each exhibiting an output waveguide mode field;

a reflective diffraction grating exhibiting a series of dispersed fields that substantially image the input waveguide mode field on each of said output waveguides whereby multiple channels conveyed by said input waveguide are separately conveyed by said output waveguides; and funnels formed in said input and output waveguides similarly sizing the input and output mode fields to produce said minimum amount of crosstalk attenuation while maximizing the bandwidths of the channels conveyed by the input and output waveguides with a minimum amount of coupling losses.

11. The device of claim 10 in which channel bandwidth "$\Delta\lambda_{FWHM}$" is approximately determined for a maximum decibel loss "$dB_{loss}$" according to the following relationship:

$$\Delta\lambda_{FWHM} = \frac{2w\sqrt{\frac{dB_{loss}}{4.34}}}{\sigma}$$

where "w" is a mode field radius of the output mode field and "$\sigma$" is a measure of wavelength dispersion along a focal line.

12. The device of claim 11 in which said funnels increase the mode field radius "w".

13. The device of claim 12 in which said funnels have inner ends that are sized in width to the same order of magnitude as the mode field radius "w".

14. The device of claim 10 in which said input and output waveguides have respective lengths that extend between outer and inner ends and said reflective diffraction grating conveys images between said inner ends of the input and output waveguides.

15. The device of claim 10 in which said input and output waveguides are formed on a planar substrate by a core material deposited on a planar substrate and covered by a similarly deposited layer of cladding having a different refractive index.

16. The device of claim 15 in which said funnels are formed by varying a width of said core material along the length of the waveguides.

17. The device of claim 16 in which said funnels are enlarged in width toward inner ends of the waveguides.

18. The device of claim 17 in which a rate of enlargement is limited to provide an adiabatic transition.

19. The device of claim 16 in which a funnel formed in the input waveguide is sized similar to said funnels formed in the output waveguides for reducing coupling losses.

20. A method of optimizing channel bandwidth at a required minimum amount of crosstalk attenuation between adjacent channels in a multiplexing/demultiplexing optical device comprising the steps of:

coupling an input waveguide to a series of output waveguides with a dispersive optic producing a series of dispersed fields that substantially image a mode field of the input waveguide on each of said output waveguides in a demultiplexing mode and that substantially image respective mode fields of the output waveguides on the input waveguide in a multiplexing mode;

forming funnels in the input and output waveguides to adjust sizes of the input and output waveguide mode fields; and increasing the size of the input and output waveguide mode fields for reducing excess crosstalk attenuation until the crosstalk attenuation reaches the required minimum amount.

21. The method of claim 20 including the further step of equally sizing the funnels formed in the input and output waveguides to reduce coupling losses.

22. The method of claim 20 in which said step of forming the funnels includes varying a width of the waveguides at a rate that provides an adiabatic transition.

23. The method of claim 20 in which channel bandwidth "$\Delta\lambda_{FWHM}$" is approximately determined for a maximum decibel loss "$dB_{loss}$" according to the following relationship:

$$\Delta\lambda_{FWHM} = \frac{2w\sqrt{\frac{dB_{loss}}{4.34}}}{\sigma}$$

where "w" is the mode field radius and "$\sigma$" is a measure of wavelength dispersion along a focal line.

24. The method of claim 23 in which crosstalk attenuation "Xtalk" is approximately determined at a given wavelength spacing "$s_{80}$" according to the following relationship:

$$Xtalk = 4.34 \left[\frac{\sigma s_\lambda}{w}\right]^2.$$

25. The method of claim 24 in which the required minimum amount of crosstalk attenuation is at least 20 decibels.

* * * * *